United States Patent
Hosmani et al.

(10) Patent No.: US 10,713,088 B2
(45) Date of Patent: Jul. 14, 2020

(54) EVENT-DRIVEN SCHEDULING USING DIRECTED ACYCLIC GRAPHS

(71) Applicant: Amazon Technologies, Inc., Seattle, WA (US)

(72) Inventors: Chetan Hosmani, Seattle, WA (US); Dougal Stuart Ballantyne, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 170 days.

(21) Appl. No.: 15/468,036

(22) Filed: Mar. 23, 2017

(65) Prior Publication Data
US 2018/0276040 A1    Sep. 27, 2018

(51) Int. Cl.
G06F 9/48 (2006.01)
G06F 9/50 (2006.01)
G06F 16/901 (2019.01)

(52) U.S. Cl.
CPC ............ *G06F 9/4881* (2013.01); *G06F 9/48* (2013.01); *G06F 9/4806* (2013.01); *G06F 9/4843* (2013.01); *G06F 9/50* (2013.01); *G06F 9/5005* (2013.01); *G06F 9/5027* (2013.01); *G06F 9/5038* (2013.01); *G06F 9/5083* (2013.01); *G06F 16/9024* (2019.01)

(58) Field of Classification Search
CPC ........ G06F 9/48; G06F 9/4806; G06F 9/4843; G06F 9/4881; G06F 9/50; G06F 9/5005; G06F 9/5027; G06F 9/5038
See application file for complete search history.

(56) References Cited

U.S. PATENT DOCUMENTS

| | | | |
|---|---|---|---|
| 6,918,111 B1* | 7/2005 | Damron | G06F 8/4442 712/200 |
| 7,117,500 B2 | 10/2006 | Pulsipher et al. | |
| 7,356,770 B1 | 4/2008 | Jackson | |
| 7,516,458 B2 | 4/2009 | Babutzka et al. | |
| 7,810,099 B2 | 10/2010 | Dettinger et al. | |
| 8,326,867 B2 | 12/2012 | Takai | |
| 8,793,365 B2 | 7/2014 | Arsovski et al. | |
| 8,990,820 B2 | 3/2015 | Plancarte et al. | |

(Continued)

OTHER PUBLICATIONS

"Slurm Quick Start User Guide", Mar. 2016, Retrieved from URL: http://slurm.schedmd.com/quickstart.html, pp. 1-11.

(Continued)

*Primary Examiner* — Charles M Swift
(74) *Attorney, Agent, or Firm* — Robert C. Kowert; Kowert, Hood, Munyon, Rankin & Goetzel, P.C.

(57) ABSTRACT

Methods, systems, and computer-readable media for event-driven scheduling using directed acyclic graphs are disclosed. A directed acyclic graph is generated that comprises a plurality of nodes and a plurality of edges. The nodes represent jobs, and the edges represent dependency relationships between individual jobs. Based (at least in part) on one or more events, a job scheduler determines that one of the nodes represents a runnable job. One or more of the dependency relationships for the runnable job are satisfied by the one or more events. An execution schedule is determined for the runnable job. Based (at least in part) on the execution schedule, execution of the runnable job is initiated using one or more computing resources.

20 Claims, 10 Drawing Sheets

(56) References Cited

U.S. PATENT DOCUMENTS

| | | | |
|---|---|---|---|
| 9,235,446 B2 | 1/2016 | Bruno et al. | |
| 9,239,996 B2 | 1/2016 | Moorthi et al. | |
| 9,323,816 B1 | 4/2016 | Clark et al. | |
| 9,477,523 B1 | 10/2016 | Warman et al. | |
| 2006/0288346 A1* | 12/2006 | Santos | G06F 9/4887 718/102 |
| 2008/0155520 A1* | 6/2008 | Meloche | H04L 41/12 717/157 |
| 2012/0039186 A1* | 2/2012 | Vasseur | H04L 45/04 370/248 |
| 2013/0268941 A1* | 10/2013 | Cherkasova | G06F 9/5066 718/104 |
| 2013/0326537 A1* | 12/2013 | Edelstein | G06F 9/4881 718/106 |
| 2013/0339972 A1 | 12/2013 | Zhang et al. | |
| 2014/0101673 A1* | 4/2014 | Klyuchevskyy | G06F 9/4881 718/106 |
| 2015/0040105 A1* | 2/2015 | Abadi | G06F 8/433 717/123 |
| 2015/0067088 A1* | 3/2015 | Guerin | G06F 15/167 709/213 |
| 2015/0205634 A1* | 7/2015 | McPherson | G06F 9/5027 718/102 |
| 2015/0268992 A1 | 9/2015 | Fan | |
| 2017/0235605 A1* | 8/2017 | Chaloupka | G06F 9/4881 718/103 |

OTHER PUBLICATIONS

International Search Report and Written Opinion from PCT/US2018/021910, dated Jun. 1, 2018, Amazon Technologies, Inc., pp. 1-14.

\* cited by examiner

US 10,713,088 B2

EVENT-DRIVEN SCHEDULING USING DIRECTED ACYCLIC GRAPHS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. Such resources at data centers, when accessed by remote customers, may be said to reside "in the cloud" and may be referred to as cloud computing resources.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner. The use of virtualization with cloud computing resources to run client programs may enable some clients to access a much greater amount of computing capacity at a given time than would be possible with the clients' on-premises resources.

Figure 1:
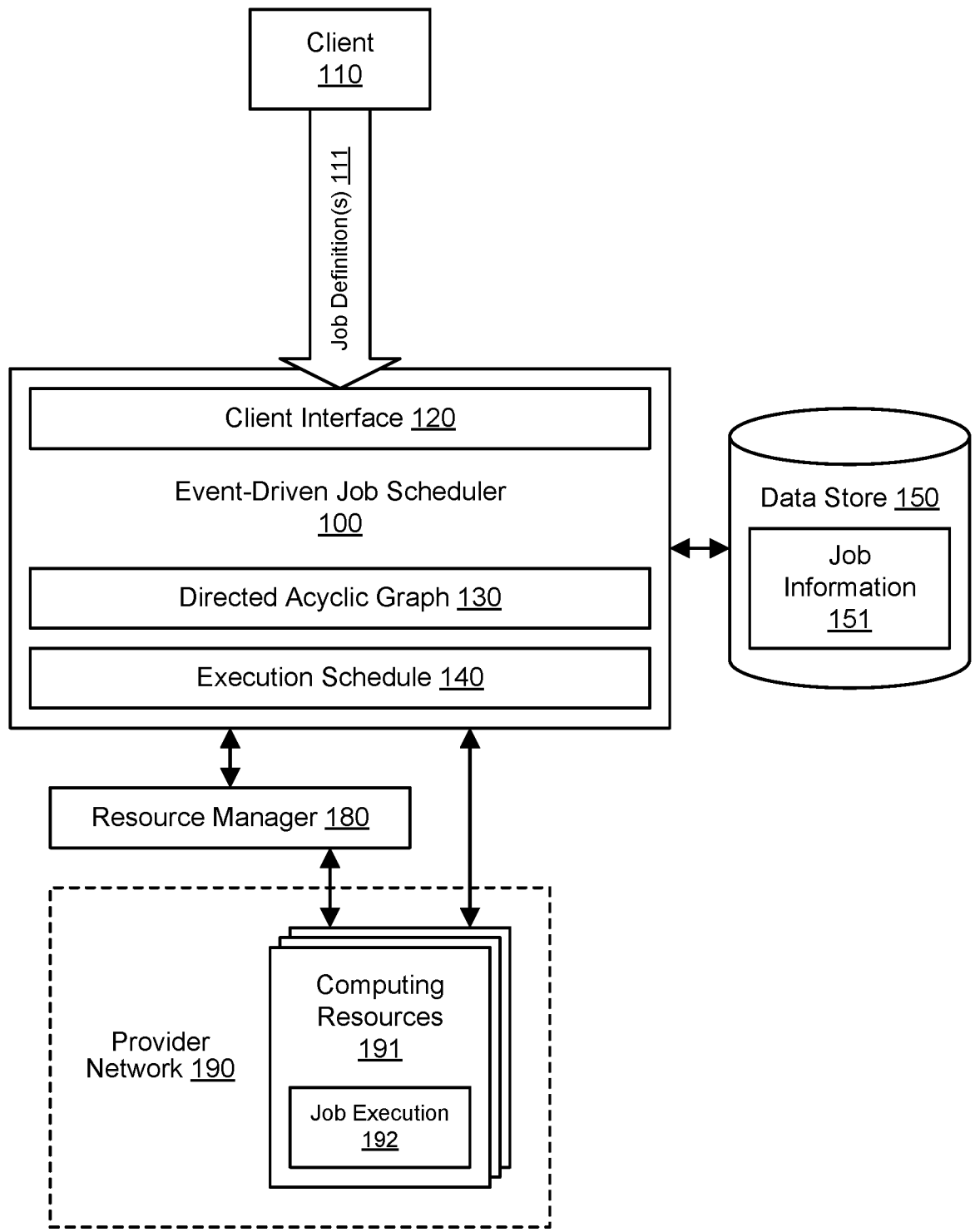
FIG. 1 illustrates an example system environment for event-driven scheduling using directed acyclic graphs, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for event-driven scheduling using directed acyclic graphs are described. Using the techniques described herein, a job scheduler may schedule job execution in an efficient manner by maintaining a graph of jobs such as a directed acyclic graph (DAG). The graph may include nodes representing jobs and edges representing dependency relationships. In the graph, the dependency relationships may indicate which nodes depend on other nodes and which nodes are depended on by other nodes. Upon evaluation of corresponding nodes, jobs with no unsatisfied dependencies may be deemed runnable and scheduled for execution based (at least in part) on an execution schedule. Newly submitted jobs that lack dependencies may be added to the execution schedule without adding corresponding nodes to the graph. The execution schedule may be implemented using an ordered data structure such as a queue or linked list. The order of jobs in the execution schedule may be based on time of submission or any other suitable criteria. Instead of repeatedly and inefficiently evaluating the entire graph, only relevant portions of the graph may be evaluated in response to events. For example, when a new job is submitted that indicates dependency on one or more earlier-submitted jobs, the earlier-submitted jobs may be updated in the graph to indicate that the new job is dependent, without evaluating unrelated nodes in the graph. As another example, when execution of a job completes, any jobs dependent on that executed job may be updated in the graph to remove the dependency relationship with the executed job and may also be evaluated for runnability, without evaluating unrelated nodes in the graph. Events causing partial evaluation of the graph may include submission of a new job, initiation of execution of a job, successful execution of a job, failed execution of a job, successful execution of a threshold percentage of a job, and so on. Upon failure of the job scheduler, the graph may be rebuilt using information descriptive of jobs with unsatisfied dependencies as retrieved from a data store. In this manner, job scheduling may be performed efficiently for large numbers of jobs with potentially complex dependencies.

FIG. 1 illustrates an example system environment for event-driven scheduling using directed acyclic graphs, according to one embodiment. An event-driven job scheduler 100 may schedule jobs for execution using suitable computing resources 191, and some of the jobs may have dependency relationships. As shown in the example of FIG. 1, the job scheduler 100 may represent one instance or client-specific session of a job scheduling service that interacts with a particular client 110. However, other instances or client-specific sessions of the job scheduling service may interact with additional clients. The client 110 may represent one or more computing devices that are configured to submit one or more job definitions 111 to the job scheduler 100. The job scheduler may receive the job definition(s) through a client interface 120. The client interface 120 may include one or more user interfaces (e.g., a graphical user interface and/or command-line interface) and/or one or more application programming interfaces (APIs) or other programmatic interfaces. The client 110 may have a preexisting relationship with an entity that offers the job scheduler to clients and/or that offers the computing resources 191, e.g., with an agreement in place for the client to pay fees for job execution or other resource usage. The job definition(s) 111 may be submitted by one or more users or automated systems associated with the client 110. One or more workloads of jobs may be received from a particular client device 110 in one batch or in multiple batches over a period of time.

A job definition may describe one or more tasks to be performed by computing resources 191 in the provider network 190. The tasks within a job definition may include entirely different tasks (e.g., tasks having different program code) and/or tasks that run the same program code for different input data. For a particular task, a job definition may include or reference program instructions to be executed in processing the task. The job definition may include or be associated with a job identifier. In one embodiment, a job identifier may be generated by the job scheduler 100 upon submission of the corresponding job definition. In one embodiment, a job identifier may include one or more alphanumeric labels provided by the client 110, such as a human-readable job name and/or one or more tags that characterize the job. A job definition may include or reference a set of input data to be processed using the program instructions, potentially using multiple copies of an application or set of program code to process different elements of the input data sequentially or concurrently. A job definition may also include or be provided with other suitable metadata, including timing information (e.g., a time to begin processing the workload, an anticipated time to run the workload, and/or a deadline), budgetary information, anticipated resource usage, and so on. For example, the anticipated resource usage in a job definition may indicate one or more values (including a range of values) for anticipated processor usage (e.g., a number of virtual CPUs), memory usage, storage usage, network usage, and/or other hardware resource characteristics.

In one embodiment, the job scheduler 100 may build and maintain a directed acyclic graph (DAG) 130 representing jobs provided by the client 110 along with job-level dependencies. The directed acyclic graph 130 may be specific to the client 110, and the same or different instances or client-specific sessions of the job scheduler 100 may build and maintain different directed acyclic graphs for the same client or for different clients. The graph 130 may include nodes representing jobs and edges representing dependency relationships from job to job. In the graph 130, the dependency relationships may indicate which nodes depend on other nodes and which nodes are depended on by other nodes. Upon evaluation of corresponding nodes, jobs with no unsatisfied dependencies may be deemed runnable and scheduled for execution based (at least in part) on an execution schedule 140. Newly submitted jobs that lack dependencies may be added to the execution schedule 140 without adding corresponding nodes to the graph 130. The execution schedule 140 may be implemented using an ordered data structure such as a queue or linked list. The order of jobs in the execution schedule 140 may be based on time of submission to the job scheduler 100 or any other suitable criteria.

The directed acyclic graph 130 may be dynamic, as new jobs may be added periodically while nodes corresponding to older jobs are periodically removed from the graph. The graph 130 may be constructed initially using any suitable algorithm for topological sorting, e.g., Kahn's algorithm. The topological sorting may compute an order for the nodes, where each lower-order node has no dependency on a higher-order node. Nodes that have no dependencies on any lower-order nodes may be termed zero-order nodes (or jobs) and may be added to the execution schedule. The zero-order nodes may be executed in a specific order determined by other attributes of the corresponding jobs, such as a first-in, first-out (FIFO) order dictated by the timestamps of job definitions. The nodes in the graph 130 and the zero-order nodes in the execution schedule 140 may be maintained in memory at the job scheduler 100, where synchronization and locking techniques may be used for concurrency control. The job scheduler 100 may also implement idempotency for events, such that applying the same event a second time does not change the outcome.

Various functions of the job scheduler 100, such as the evaluation of dependencies in the graph 130 and/or the evaluation of the runnability of jobs in the graph, may be driven by events. The various functions of the job scheduler 100 may be performed in response to events that are generated internally or externally with respect to the scheduler. Instead of repeatedly and inefficiently evaluating the entire graph, only relevant portions of the graph may be evaluated in response to events. For example, when a new job is submitted that indicates dependency on one or more earlier-submitted jobs, the earlier-submitted jobs may be updated in the graph 130 to indicate that the new job is dependent, without evaluating unrelated nodes in the graph. As another example, when execution of a job completes using the computing resources 191, any jobs dependent on that executed job may be updated in the graph 130 to remove the dependency relationship with the executed job and may also be evaluated for runnability, without evaluating unrelated nodes in the graph. Events causing partial evaluation of the graph 130 may include submission of a new job, initiation of execution of a job, successful execution of a job, failed execution of a job, successful execution of a threshold percentage of a job, and so on. In this manner, job scheduling may be performed efficiently for large numbers of jobs with potentially complex dependencies.

The job scheduler 100 or another suitable component may select and reserve one or more computing resources 191 offered by a provider network 190 for execution of jobs on behalf of the client 110. By interacting with a resource manager 180 associated with the provider network 190, computing resources 191 may be automatically provisioned and deprovisioned for execution of scheduled jobs. The computing resources 191 may include compute instances, storage instances, and so on. The computing resources 191 may include components or other functionalities implementing job execution 192 for jobs scheduled using the job scheduler 100. In one embodiment, computing resources having particular configurations may be selected, such as compute instances of particular instance types and/or software configurations with particular parameter values. In one embodiment, the particular configurations may be selected based (at least in part) on input from the client 110, such as a list of instance types that are usable for a particular job or a list of instance types on which a task is to be tested for optimization purposes. In one embodiment, the particular configurations may be selected without input from the client 110, e.g., automatically and/or programmatically by one or more components associated with the job scheduler 100 or resource manager 180. Particular configurations may be selected based on job definitions 111. For example, if a job definition indicates that a particular number of virtual CPUs is required for a task, or a particular amount of memory is required, then only computing resources that meet or exceed such requirements may be selected in one embodiment. The job scheduler 100 may determine a time at which to initiate execution of a particular job, e.g., based (at least in part) on the execution schedule 140. In one embodiment, the job scheduler 100 may determine one or more particular computing resources with which to initiate execution of a particular job, e.g., within a compute environment associated with the client that provided the job.

In one embodiment, a container management system may be used with the job execution 192 to deploy the program instructions supplied or otherwise referenced by the client. For example, a provisioned instance may be launched using a machine image that includes a container management system. In various embodiments, the instance may be launched either before the job is scheduled or in response to the scheduling of the job. After launch, a container may be filled with the program instructions indicated by the client for performing one or more tasks associated with the job. In one embodiment, tasks may also represent programs (and potentially input data) submitted to a program execution service that manages its own fleet of compute instances. In one embodiment, the job execution 192 may be configured for tasks associated with batch applications. In one embodiment, the job execution 192 may be configured for web applications, microservice applications, and/or services running on top of an environment such as a container service.

The computing resources 191 may be selected from one or more resource pools of a provider network 190 that offers different resource pools. In one embodiment, the different pools may vary in the hardware characteristics of their constituent resources, such as a processor capability or configuration, a memory capability or configuration, a storage capability or configuration, a networking capability or configuration, and so on. In one embodiment, the different pools may vary in geographical location, potentially including different availability zones or other regions as configured by the operator of the provider network 190. The availability zones may represent locations or areas within regions, and the regions may be defined by appropriate boundaries (e.g., geographic, business-based, political, and/or arbitrary). In one embodiment, the different pools may represent different purchasing modes offered by the provider network 190. For example, the computing resources 191 may be offered in a spot market in which an instance reservation is not be guaranteed to be maintained if a higher bid is received, in an on-demand market in which an instance reservation may be guaranteed for an agreed-upon duration (e.g., one hour), or in an long-term market in which an instance reservation may be guaranteed for a longer duration (e.g., one year). The different purchasing modes may be associated with different costs to the client 110, e.g., such that spot instances are typically less expensive per unit of time than on-demand instances.

In one embodiment, the computing resources 191 may be part of a compute environment that is managed on behalf of the client 110 by a compute environment management system that includes the job scheduler 100. The client interface 120 may be used for receipt of input other than job definition(s) 111 from the client 110; the other input may represent user input and/or input generated programmatically. For example, the input may specify or reference one or more constraints and/or one or more queue identifiers for a particular compute environment. Based (at least in part) on the input, the compute environment management system may generate a compute environment specification for a compute environment associated with the client. The compute environment management system may then manage, on behalf of the client, resources in a compute environment consistent with the specification. Alternatively, the compute environment management system may permit the client to perform management of computing resources within a compute environment, potentially including provisioning, deprovisioning, assignment of jobs, and/or configuration of resources.

A compute environment specification may also include additional metadata or configuration data usable for managing a set of computing resources. The additional metadata or configuration data may represent other properties or attributes of the compute environment or its constituent resources. For example, the compute environment specification may associate particular labels (e.g., alphanumeric tags) with particular resources for ease of resource management. As another example, the compute environment specification may include data associating a compute environment with a virtual private cloud (VPC) representing a virtual network, e.g., within the provider network 190. The VPC may be isolated from other resources and VPCs within the provider network 190 and may have its own range of IP addresses referred to as a subnet; resources in the compute environment may be launched into the subnet.

In one embodiment, the job scheduler 100 may implement one or more job queues associated with particular queue identifier(s), e.g., as provided by a client and mapped to a particular compute environment. A job queue may include a set of related secondary queues, such that jobs may be moved from one of the related queues to another one of the related queues if appropriate conditions or met. For example, when a job definition is first submitted, the job may be placed initially in a submitted queue. If a job in the submitted queue has no dependencies, the scheduler 100 may move that job to a runnable queue. The runnable queue may be implemented using a linked list or other ordered data structure and may be used to implement the execution schedule 140. A job having one or more dependencies may be moved from the submitted queue to a pending queue. Individual jobs may be associated with various states such as submitted, pending, runnable, running, succeeded, failed, and so on. A change from one state to another state may constitute an event that causes evaluation of a relevant portion of the graph 130.

In one embodiment, the various queues and the directed acyclic graph 130 may be maintained in memory or other storage locally accessible to the computing device(s) that implement the job scheduler 100. In one embodiment, at least a portion of the information related to the directed acyclic graph 130 and the various queues may be stored in a data store 150 that stores information 151 descriptive of jobs. In one embodiment, jobs in the pending queue may be stored in the data store 150. In one embodiment, all jobs may be represented in the data store for at least some length of time. In case of failure of the job scheduler 100, the pending queue may be rebuilt by another instance of the job scheduler by loading the relevant job information 151 from the data store 150. The data store 150 may be implemented using any suitable storage system or storage service. In one embodiment, the data store 150 may be implemented using a key-value data store such as DynamoDB™ from Amazon. In various embodiments, the job scheduler 100, data store 150, and/or computing resources 191 may reside "in the cloud" and may be accessed over a publicly accessible network such as the Internet.

Figure 10:
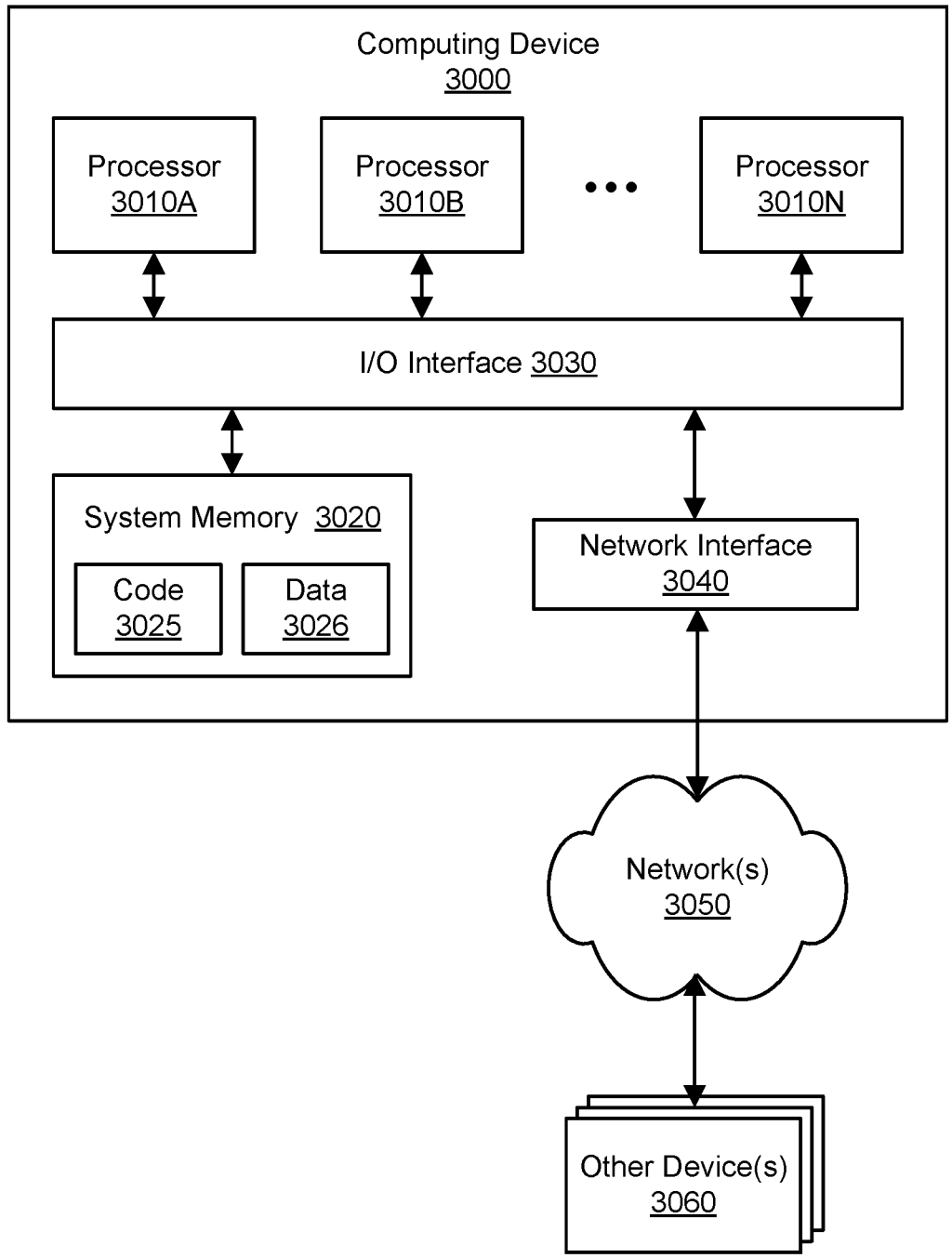
FIG. 10 illustrates an example computing device that may be used in some embodiments.

The client 110 may represent one or more computing devices, any of which may be implemented by the example computing device 3000 illustrated in FIG. 10. The client device(s) 110 may be coupled to the job scheduler 100 via one or more networks, potentially including the Internet. It is contemplated that any suitable number and configuration of client devices may be used to provide configuration information and jobs to the job scheduler 100. The client 110 may encompass any type of client configurable to submit configuration information to the job scheduler 100. For example, a given client device may include a suitable version of a web browser, or it may include a plug-in module or other type of code module configured to execute as an extension to or within an execution environment provided by a web browser. Alternatively, a client device may encompass an application such as a database application (or user interface thereof), a media application, an office application, or any other application that may interact with the client interface 120 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, the client device(s) 110 may be configured to generate network-based service requests according to a Representational State Transfer (REST)-style network-based services architecture, a document- or message-based network-based services architecture, or another suitable network-based services architecture. In at least some embodiments, the client device(s) 110 may provision, mount, and configure storage volumes implemented at storage services within the provider network 190 for file systems implemented at the client device.

The client device(s) 110 may convey network-based service requests to the job scheduler 100 via one or more networks. In various embodiments, the network(s) may encompass any suitable combination of networking hardware and protocols necessary to establish network-based communications between the client device(s) 110 and compute environment management system 100. For example, the network(s) may generally encompass the various telecommunications networks and service providers that collectively implement the Internet. The network(s) may also include private networks such as local area networks (LANs) or wide area networks (WANs) as well as public or private wireless networks. For example, both the client device(s) 110 and the job scheduler 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the client device(s) 110 and the Internet as well as between the Internet and the job scheduler 100. It is noted that in some embodiments, client device(s) 110 may communicate with the job scheduler 100 using a private network rather than the public Internet.

The provider network 190 may include a plurality of computing resources 191. The resources may include compute instances, storage instances, and so on. The resources offered by the provider network 190 may vary in their respective configurations. The configuration of a computing resource may include its instance type, hardware capabilities (e.g., type and number of processor cores, type and number of virtual CPUs, type and amount of memory and storage, presence or absence of specialized coprocessors such as a graphics processing unit (GPU), presence or absence of particular application-specific integrated circuits (ASICs) or field-programmable gate arrays (FPGAs), and so on), software configuration (e.g., operating system type and configuration, virtualized execution environment type and configuration, application type and configuration, and so on), and/or other suitable characteristics. For example, the provider network may include a set of compute instances (physical compute instances and/or virtual compute instances) of different compute instance types, where the compute instance types may vary in the capabilities and features of their processor resources, memory resources, storage resources, network resources, and so on, and potentially in their cost as well. The configuration of a computing resource may impact the performance of that resource for executing a particular task, such that resources having different configurations may vary in performance (e.g., processor performance, execution time, memory usage, storage usage, network usage, energy usage, and so on) for the same or similar tasks. The resources offered by the provider network 190 may also vary in their respective costs that are assessed to clients for reserving and/or using the resources. In one embodiment, the costs may vary by hardware configuration as well as by purchasing mode. Additionally, the resources offered by the provider network 190 may vary in their availability at particular times. The provider network 190 may include additional components not shown, fewer components than shown, or different combinations, configurations, or quantities of the components shown.

The provider network 190 may include a network set up by an entity such as a company or a public sector organization to provide one or more services (such as various types of network-accessible computing or storage) accessible via the Internet and/or other networks to a distributed set of clients. The provider network 190 may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network 190 in different embodiments, including general purpose or special purpose computer servers, storage devices, network devices, and the like. Because resources of the provider network 190 may be under the control of multiple clients (or tenants) simultaneously, the provider network may be said to offer multi-tenancy and may be termed a multi-tenant provider network. For example, virtual compute instances in a multi-tenant provider network 190 may be concurrently used for the processing of jobs by the client 110 as well as by another client.

In some embodiments, an operator of the provider network 190 may implement a flexible set of resource reservation, control, and access interfaces for their clients. For example, the resource manager 180 may implement a programmatic resource reservation interface (e.g., via a web site or a set of web pages) that allows clients and/or other components such as the job scheduler 100 to learn about, select, purchase access to, and/or reserve compute instances offered by the provider network 190. Such an interface may include capabilities to allow browsing of a resource catalog and provide details and specifications of the different types or sizes of resources supported, the different reservation types or modes supported, pricing models, and so on. The provider network 190 may support several different purchasing modes (which may also be referred to herein as reservation modes) in various embodiments: for example, long-term reservations, on-demand resource allocation, or spot-price-based resource allocation.

Using the long-term reservation mode, a client may make a low, one-time, upfront payment for a resource instance, reserve it for a specified duration such as a one-year or three-year term, and pay a low hourly rate for the instance; the client may be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. During periods when the supply of the requested resource type exceeds the demand, the spot price may become significantly lower than the price for on-demand mode. In some implementations, if the spot price increases beyond the maximum bid specified by a client, a resource allocation may be interrupted: e.g., a resource instance that was previously allocated to the client may be reclaimed by the resource manager 180 and may be allocated to some other client that is willing to pay a higher price. Other purchasing modes or combinations of modes may be implemented by the resource manager 180 in some embodiments.

In one embodiment, the provider network 190 may offer virtual compute instances with varying computational and/or memory resources. In one embodiment, each of the virtual compute instances may correspond to one of several instance types. An instance type may be characterized by its computational resources (e.g., number, type, and configuration of central processing units [CPUs] or CPU cores, including virtual CPUs), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the resource manager 180, an instance type may be selected for a job, e.g., based (at least in part) on input from the client. For example, a client may choose an instance type from a predefined set of instance types. As another example, a client may specify the desired resources of an instance type for a job (e.g., in the job definition), and the resource manager 180 may select an instance type based on such a specification.

Virtual compute instance configurations may also include virtual compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Configurations of virtual compute instances may also include their location in a particular data center or availability zone, geographic location, and (in the case of reserved compute instances) reservation term length.

In one embodiment, a compute environment management system that includes the job scheduler 100 may automatically manage the provisioning and deprovisioning of scheduled reserved compute instances on behalf of clients, e.g., such that scheduled reserved instances are automatically added to or removed from particular compute environments at appropriate times. Scheduled reserved instances may include computing resources (e.g., compute instances) that are accessible by or on behalf of a client for a particular period of time, e.g., based on a reservation. In one embodiment, the computing resources associated with such a reservation may be exclusively used by a particular client and not by other clients during the period of time. The job scheduler 100 of the compute environment management system may automatically manage job queues associated with scheduled reserved compute instances and their compute environments, e.g., such that clients may add jobs to the queues before and/or during the windows of time associated with the scheduled reserved instances.

The job scheduler 100 may include a plurality of computing devices, any of which may be implemented by the example computing device 3000 illustrated in FIG. 10. In various embodiments, portions of the described functionality of the job scheduler 100 may be provided by the same computing device or by any suitable number of different computing devices. If any of the components of the job scheduler 100 are implemented using different computing devices, then the components and their respective computing devices may be communicatively coupled, e.g., via a network. Each of the illustrated components may represent any combination of software and hardware usable to perform their respective functions. It is contemplated that the job scheduler 100 may include additional components not shown, fewer components than shown, or different combinations, configurations, or quantities of the components shown.

Figure 2:
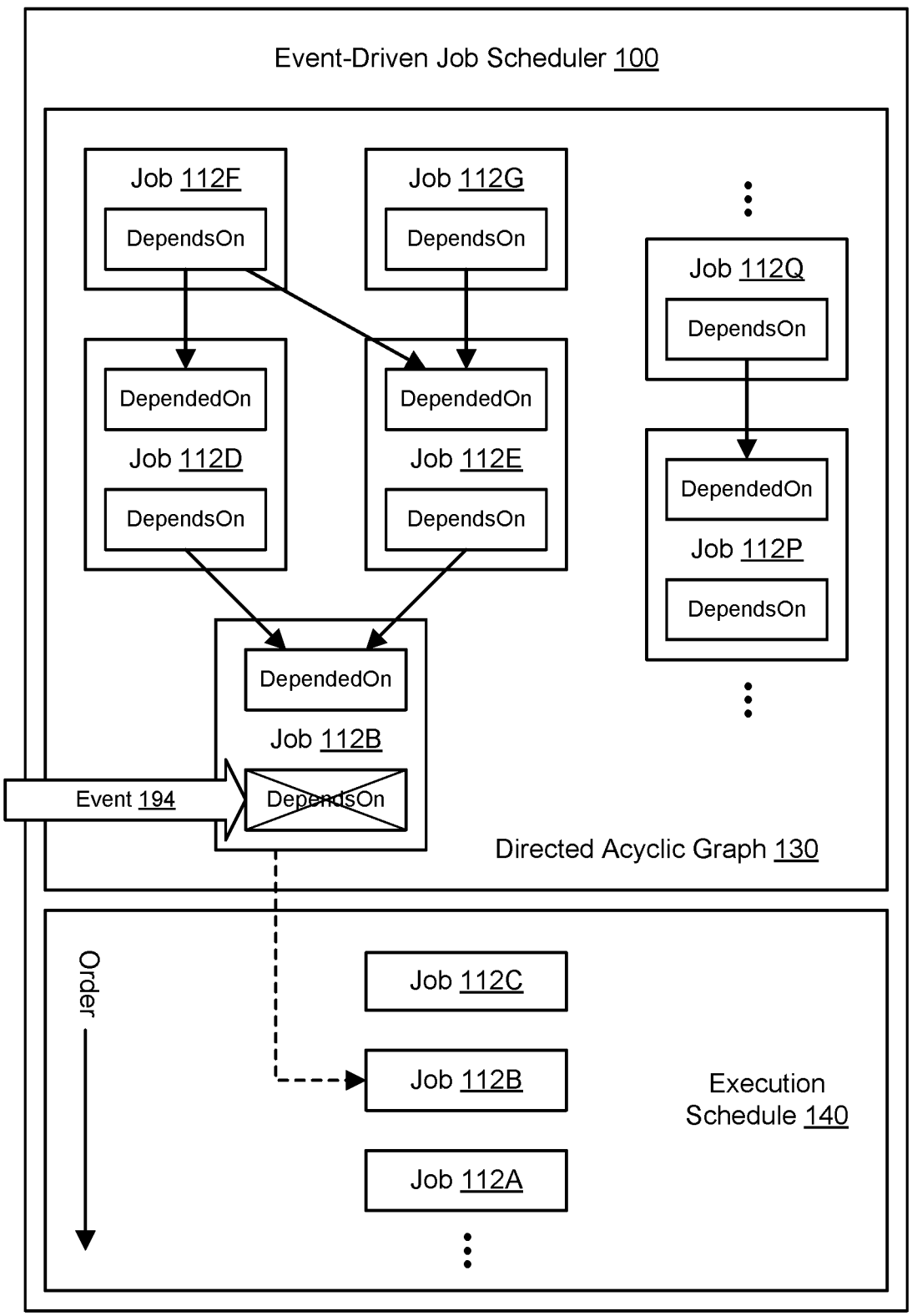
FIG. 2 illustrates further aspects of the example system environment for event-driven scheduling using directed acyclic graphs, including analysis of dependency relationships in a directed acyclic graph to determine that a job is runnable, according to one embodiment.

FIG. 2 illustrates further aspects of the example system environment for event-driven scheduling using directed acyclic graphs, including analysis of dependency relationships in a directed acyclic graph to determine that a job is runnable, according to one embodiment. The directed acyclic graph 130 may include nodes representing jobs provided by the client 100. In one embodiment, the directed acyclic graph 130 may be constructed initially by examining any job-level dependencies in a batch or other set of job definitions. In one embodiment, as long as the job scheduler 100 remains operable, the directed acyclic graph 130 may be updated efficiently in response to new events and not rebuilt entirely with every event. Nodes representing jobs that are not yet ready to run may be held in the directed acyclic graph 130, e.g., until their dependencies have been satisfied. The graph 130 may also include earlier-submitted nodes that later-submitted nodes continue to depend on, even if execution of the earlier-submitted nodes has completed. In one embodiment, each individual node may be associated with a current state such as submitted, pending, runnable, running, succeeded, failed, and so on. A change from one state to another state may constitute an event that causes evaluation of a relevant portion of the graph 130. Nodes with no unsatisfied "DependsOn" dependencies may be deemed runnable at any time and may be represented in the execution schedule 140. The jobs in the execution schedule 140 may be ordered, e.g., based on timestamps of the submission of job definitions and/or on any other suitable criteria.

As shown in the example of FIG. 2, the execution schedule may initially include job 112A and job 112C. Job 112A and 112C may have been added to the schedule upon submission if they lacked dependencies or, if they initially had dependencies, at a later time when their dependencies on earlier-submitted jobs were satisfied. In one embodiment, one or more nodes in the directed acyclic graph 130 may be evaluated to determine whether the node(s) (and corresponding job(s)) are runnable. Runnable nodes and jobs may have no unmet DependsOn dependency relationships and may be executed without delay, e.g., without necessarily waiting for conditions associated with other jobs to be met. Satisfaction of a dependency may be determined based (at least in part) on an event (such as event 194) associated with a job that the dependency involves. For example, if a particular job was dependent on completion of an earlier-submitted job, and that earlier-submitted job has completed execution, then the particular job may be deemed runnable by evaluation of its corresponding node in the graph 130 in response to an execution event associated with the earlier-submitted job. The event 194 causing partial evaluation of the graph 130 may represent submission of a new job, initiation of execution of a job, successful execution of a job, failed execution of a job, completion of a job (with success or failure), successful execution of a threshold percentage of a job, cancellation of a job, and so on.

As also shown in the example of FIG. 2, the directed acyclic graph 130 may include nodes representing a set of jobs such as job 112B, job 112D, job 112E, job 112F, job 112G, job 112P, job 112Q, and so on. Any of the nodes shown in the graph 130 in FIG. 2 may indicate zero, one, or many DependsOn dependency relationships, e.g., using an appropriate data structure associated with the node. Any of the nodes shown in the graph 130 in FIG. 2 may indicate zero, one, or many DependedOn dependency relationships, e.g., using an appropriate data structure associated with the node. For example, job 112B may have a DependedOn dependency relationship with respect to job 112D and job 112E. Job 112B may also have a prior DependsOn dependency relationship with another node, and that dependency has been satisfied by the event 194. For example, job 112B may have been dependent on completion of an earlier-submitted job, and event 194 may represent that completion. Likewise, job 112D and 112E may have a DependsOn dependency relationship with respect to job 112B, such that job 112D and job 112E may not be deemed runnable until a condition regarding job 112B has been satisfied. In one embodiment, dependency relationships may be associated with various conditions such as the initiation of job execution, the successful completion of job execution, the failed completion of job execution, the successful or failed completion of job execution, the successful completion of a threshold percentage (e.g., 60%) of the tasks in a job, and so on.

Dependency relationships may be one-to-one, one-to-many, or many-to-one. For example, the graph 130 may also include a dependency relationship of job 112F upon both job 112D and job 112E, such that conditions (e.g., for successful execution) must be met for both jobs 112D and 112E before job 112F may be deemed runnable and added to the execution schedule 140. Job 112E may be depended on by both job 112F and job 112G. In response to events, only the relevant nodes in the graph 130 may be evaluated, e.g., for runnability. Job 112Q may depend upon job 112P, but jobs 112P and 112Q may be unconnected to the remaining jobs shown in FIG. 2. If an event is received that is relevant to job 112B, job 112D, job 112E, job 112F, or job 112G, then evaluation of the effects of that event may involve only those nodes and may bypass the nodes corresponding to unrelated jobs 112P and 112Q. In this manner, the directed acyclic graph 130 may be built once and then updated periodically and efficiently by analyzing and modifying only relevant portions of the graph.

As also shown in the example of FIG. 2, in light of the event 194, the node corresponding to job 112B may be evaluated to determine whether it is runnable (i.e., for runnability). The evaluation and analysis may be performed automatically (e.g., without necessarily requiring user input) and programmatically (e.g., by execution of program instructions). The job 112B may be evaluated for runnability in response to the event 194 that is relevant to that job 112B, such as an execution event involving a job on which the job 112B depends. As shown in the example of FIG. 2, if the evaluation of the node determines that job 112B has no more unmet DependsOn relationships, then the scheduler 100 may move the job into the execution schedule 140. The job 112B may be inserted into the existing order of jobs in the schedule 140 in any appropriate location, e.g., as based (at least in part) on the order of job submission to the scheduler 100. For example, based on the respective timestamps for jobs 112A, 112B, and 112C, the job 112B may be inserted in the schedule 140 between the earlier-submitted job 112A and the later-submitted job 112C. In one embodiment, the order of jobs in the execution schedule 140 may be maintained in the data store 150. For example, the data store 150 may include a sorting function that may sort the runnable jobs based on a particular key value, e.g., time of submission. When the graph 130 is evaluated and the execution schedule 140 is modified, the job scheduler 100 may insert a newly runnable job into the predetermined order without necessarily having to resort the entire schedule. In one embodiment, the node corresponding to the job 112B may remain in the graph 130 as long as one or more other nodes depend upon that node.

In one embodiment, the acyclic nature of the graph 130 may be enforced by automatically generating job identifiers when jobs are submitted to the job scheduler 100 and by requiring dependency relationships to be specified in terms of job identifiers. Accordingly, in one embodiment, a dependency relationship for a particular job may only specify the job identifier of an earlier-submitted job. In one embodiment, job identifiers may instead be assigned by the client 110, and the acyclic nature of the graph 130 may be enforced in a different manner. For example, a list of edges representing dependency relationships may be maintained, and the edges may be analyzed to determine any cyclic dependencies, e.g., upon an event associated with job submission. Jobs submitted with cyclic dependencies may be rejected by the job scheduler 100.

Figure 3:
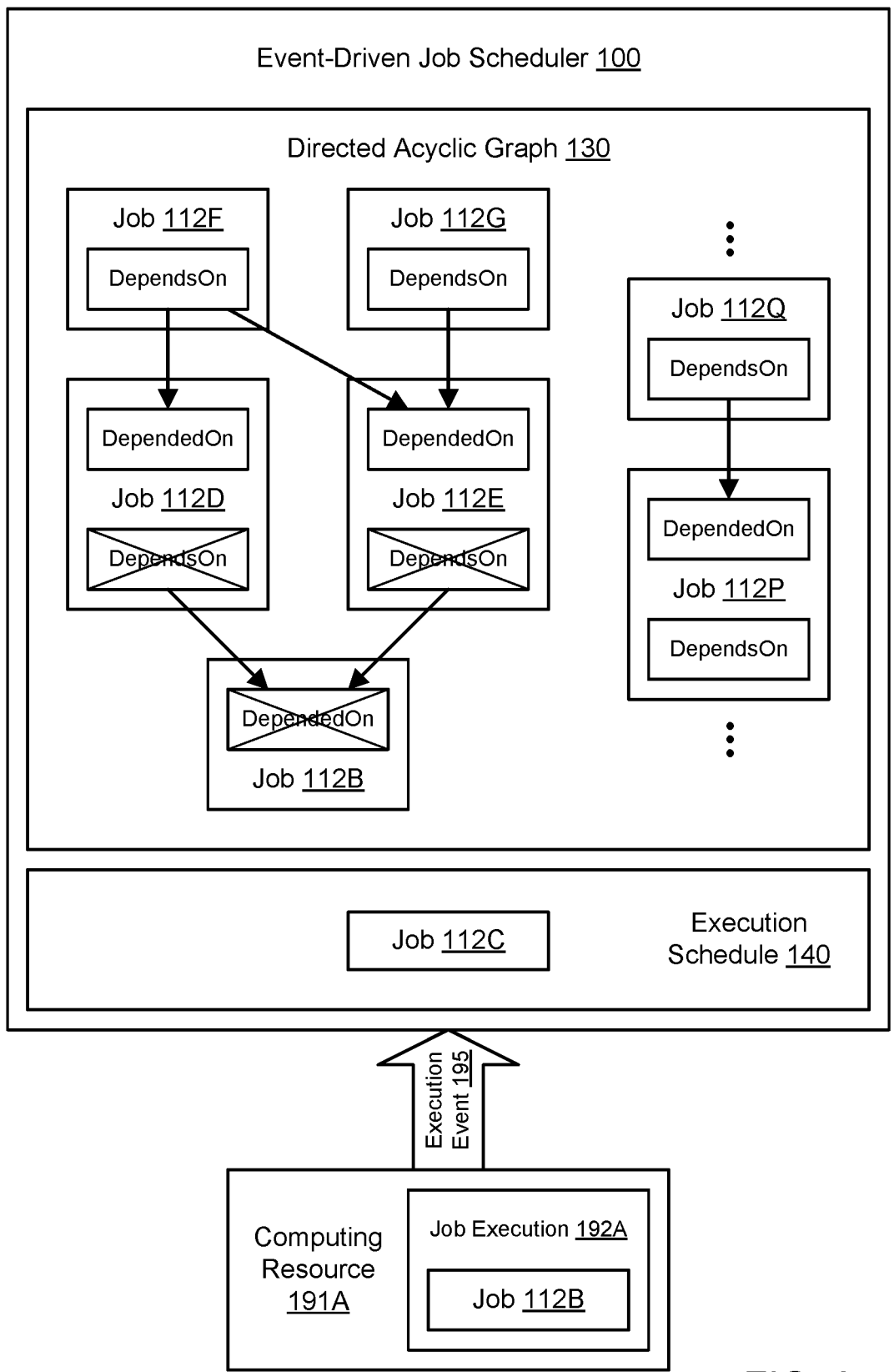
FIG. 3 illustrates further aspects of the example system environment for event-driven scheduling using directed acyclic graphs, including event-driven analysis of a directed acyclic graph to update dependency relationships, according to one embodiment.

FIG. 3 illustrates further aspects of the example system environment for event-driven scheduling using directed acyclic graphs, including event-driven analysis of a directed acyclic graph to update dependency relationships, according to one embodiment. Continuing the example of FIG. 2, the job 112B may be executed using a job execution component 192A of a computing resource 191A of the provider network 190. In association with the execution of job 112B, an execution event 195 may be generated and provided to the job scheduler 100. The execution event 195 may indicate a condition such as the initiation of job execution, the successful completion of job execution, the failed completion of job execution, the successful or failed completion of job execution, the successful completion of a threshold percentage (e.g., 60%) of the tasks in a job, and so on. In one embodiment, the execution event 195 may be "pushed" by the computing resource 191A. Based (at least in part) on the execution event 195, a relevant portion of the graph 130 may be analyzed or evaluated without the need to evaluate the remainder of the graph. For example, automatic and programmatic analysis or evaluation of the graph 130 may determine that two other nodes (corresponding to jobs 112D and 112E) have dependency relationships with the job 112B. The automated and programmatic analysis or evaluation of the graph 130 may update the node corresponding to job 112B to remove the DependedOn element for that node and may also update the nodes corresponding to job 112D and 112E to remove the DependsOn element for both of those nodes. Removal of a DependedOn element and its corresponding DependsOn element may represent the removal of that edge from the graph 130. In one embodiment, upon determining that the node corresponding to job 112B has no further DependedOn relationships, the scheduler 100 may remove the node from the graph 130.

Figure 4:
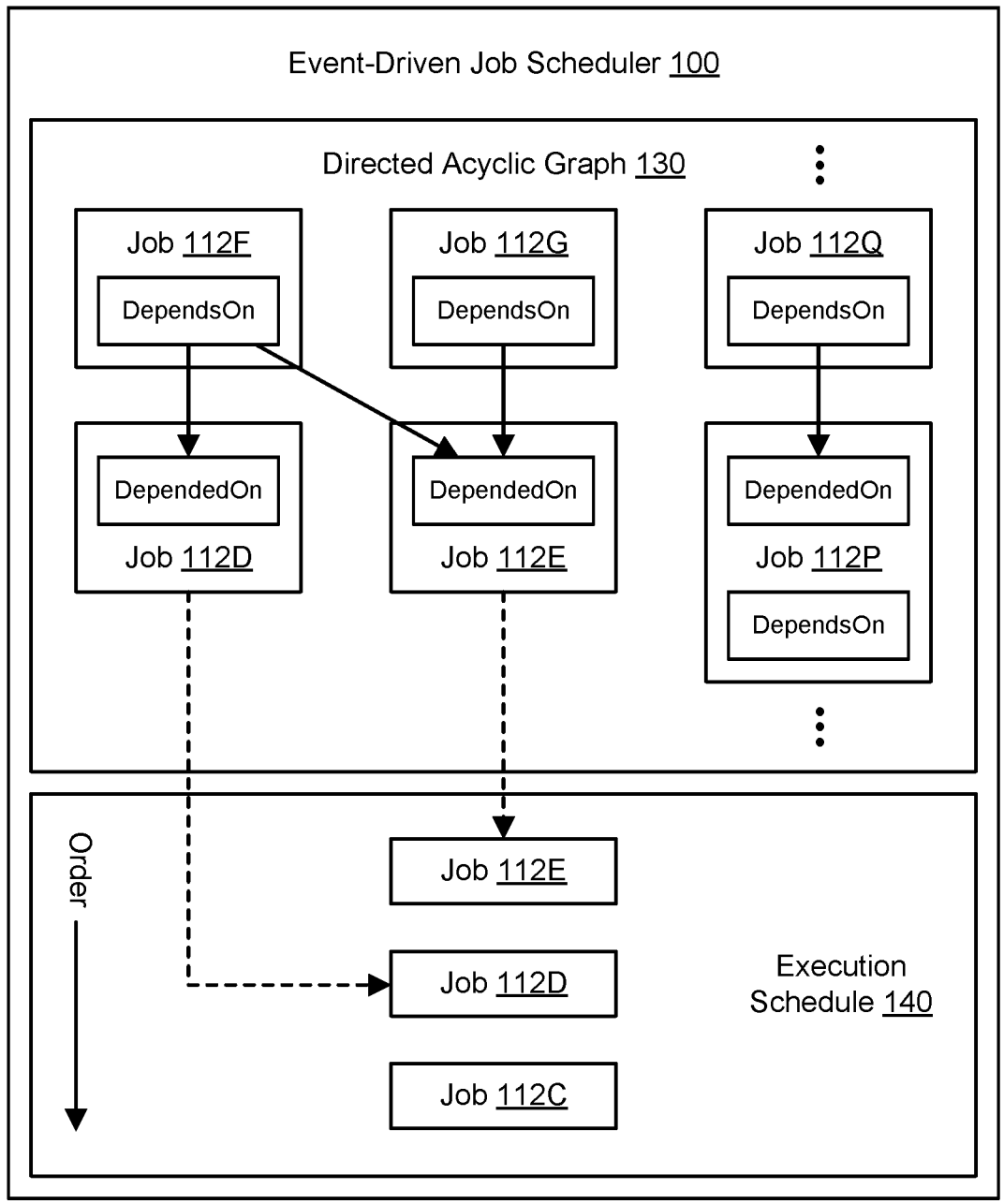
FIG. 4 illustrates further aspects of the example system environment for event-driven scheduling using directed acyclic graphs, including event-driven analysis of dependency relationships in a directed acyclic graph to determine that jobs are runnable, according to one embodiment.

FIG. 4 illustrates further aspects of the example system environment for event-driven scheduling using directed acyclic graphs, including event-driven analysis of dependency relationships in a directed acyclic graph to determine that jobs are runnable, according to one embodiment. As discussed above with respect to FIG. 3, event-driven analysis or evaluation of the graph 130 may update the node corresponding to job 112B to remove the DependedOn element for that node and may also update the nodes corresponding to job 112D and 112E to remove the DependsOn element for both of those nodes. In one embodiment, upon determining that the node corresponding to job 112D has no further DependsOn relationships due to the event 195, the scheduler 100 may deem the job 112D runnable and may add the job 112D to the execution schedule 140. Similarly, upon determining that the node corresponding to job 112E has no further DependsOn relationships due to the event 195, the scheduler 100 may deem the job 112E runnable and may add the job 112E to the execution schedule 140. The jobs 112D and 112E may be inserted into the existing order of jobs in the schedule 140 in any appropriate location, e.g., as based (at least in part) on the order of job submission to the scheduler 100. For example, based on the respective timestamps for jobs 112C, 112D, and 112E, the job 112D may be inserted in the schedule 140 after the earlier-submitted job 112C, and the job 112E may be inserted in the schedule 140 after the earlier-submitted job 112D. In one embodiment, the nodes corresponding to the jobs 112D and 112E may remain in the graph 130 as long as one or more other nodes depend upon that node. As discussed above, the unconnected nodes for jobs 112P and 112Q may be untouched in this particular process of event-driven evaluation and analysis.

Figure 5:
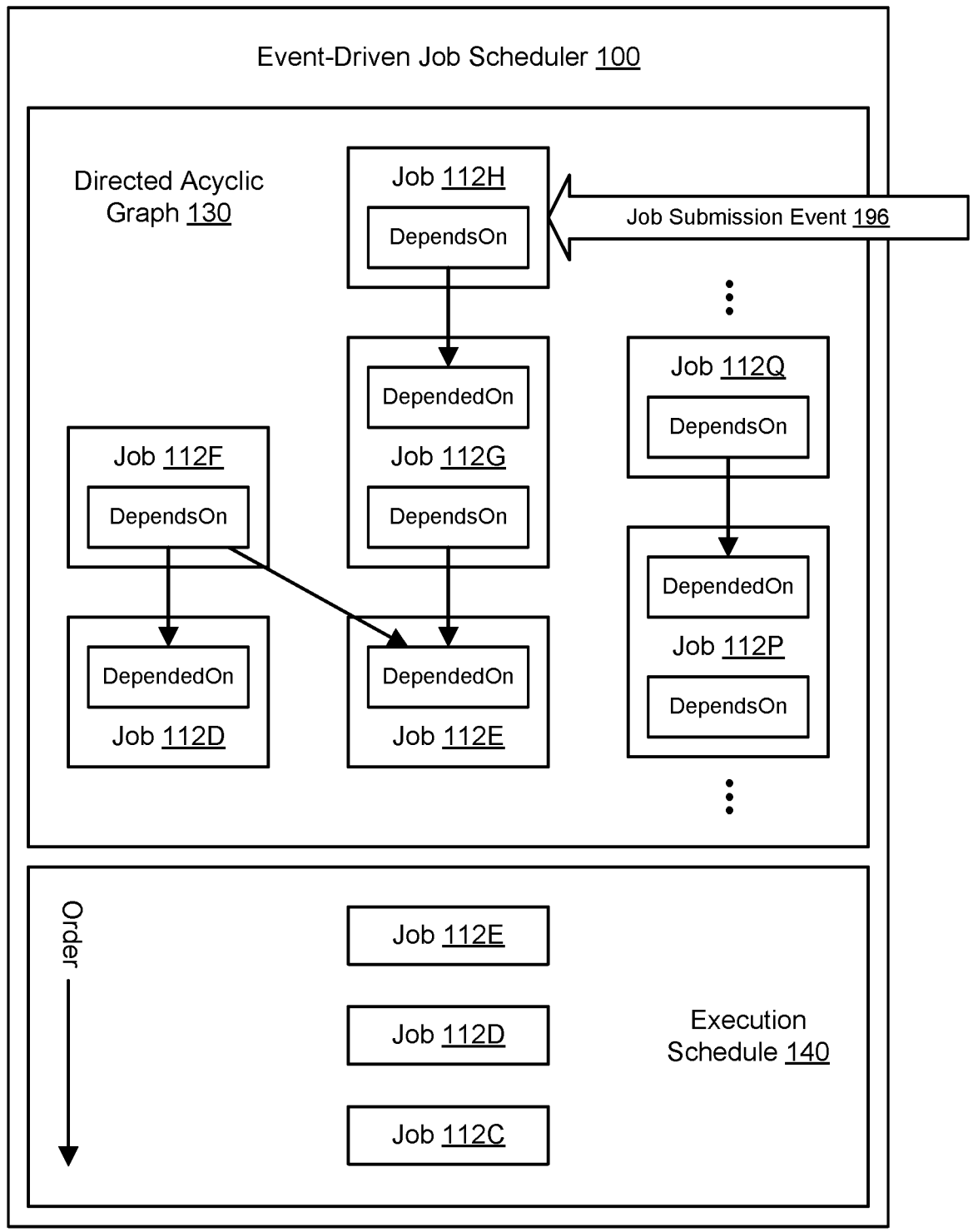
FIG. 5 illustrates further aspects of the example system environment for event-driven scheduling using directed acyclic graphs, including event-driven analysis of a directed acyclic graph to add a new node representing a newly submitted job, according to one embodiment.

FIG. 5 illustrates further aspects of the example system environment for event-driven scheduling using directed acyclic graphs, including event-driven analysis of a directed acyclic graph to add a new node representing a newly submitted job, according to one embodiment. As shown in the example of FIG. 5, a new job 112H may be submitted to the job scheduler 100 after evaluation of the execution event 195 discussed above. The submission of the new job 112H may represent a job submission event 196. Automated evaluation and analysis of the job submission event 196 may determine that the new job depends on the earlier-submitted job 112G. In one embodiment, the node corresponding to job 112G may be updated automatically (e.g., without necessarily requiring user input) and programmatically (e.g., by execution of program instructions) to add a DependedOn element with respect to the new job 112H. A node corresponding to the new job 112H may also be added to the graph 130, and that node may include a DependsOn element with respect to the job 112G. Adding the DependedOn element to node 112G and adding the DependsOn element to node 112H may represent the addition of an edge to the directed acyclic graph 130. Unrelated nodes (e.g., for jobs 112D, 112E, 112F, 112P, and 112Q) may be untouched in this particular process of event-driven evaluation and analysis. In one embodiment, the newly submitted job may specify a DependsOn relationship with an earlier-submitted job that is not currently in the graph 130, e.g., if that earlier-submitted job is in the execution schedule 140 and had no prior dependencies of any sort. In such circumstances, a node corresponding to the earlier-submitted job may be added to the graph 130 in order to represent the dependency relationship with the newly submitted job.

Figure 6:
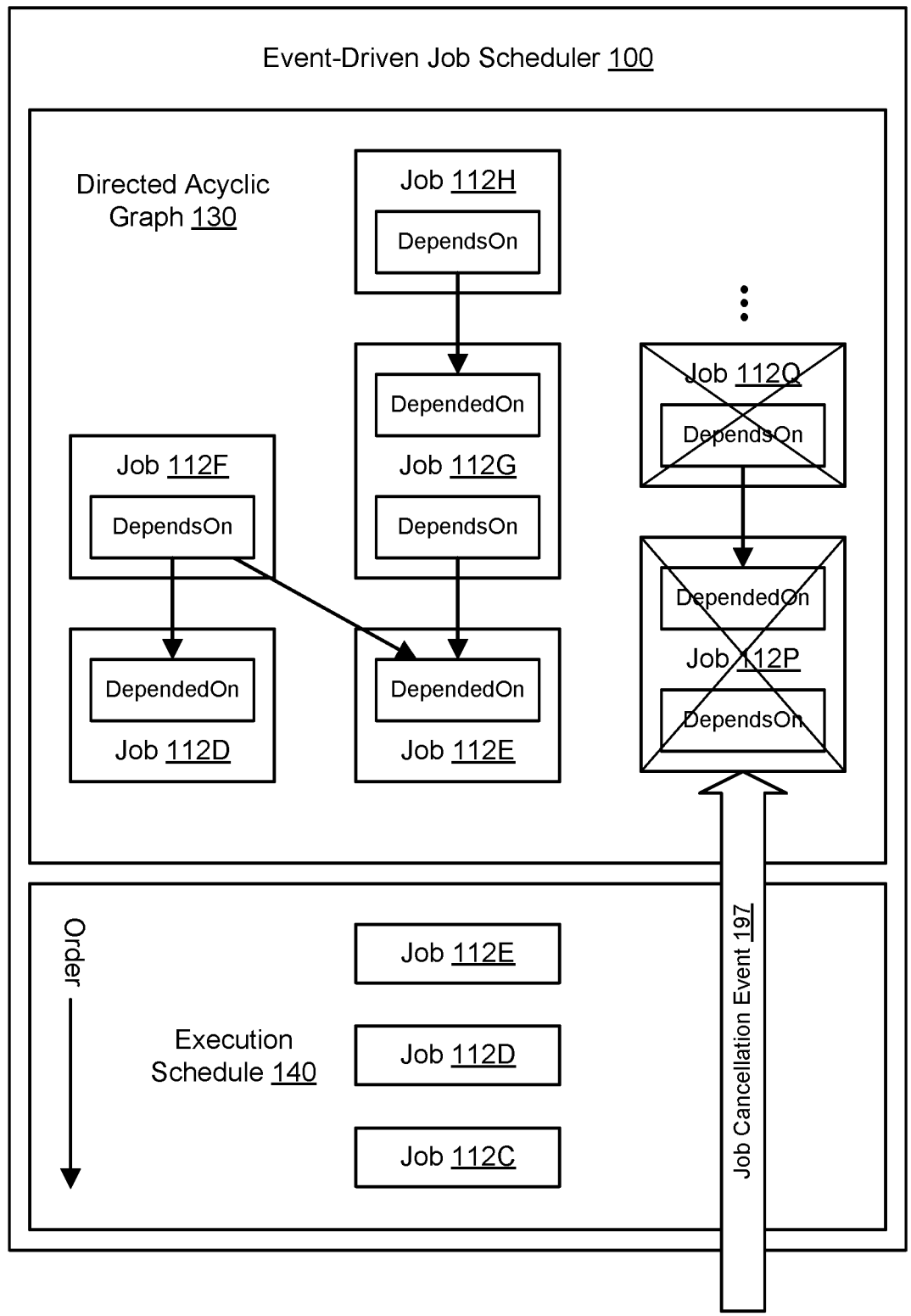
FIG. 6 illustrates further aspects of the example system environment for event-driven scheduling using directed acyclic graphs, including event-driven analysis of a directed acyclic graph to remove nodes due to cancellation or failure, according to one embodiment.

FIG. 6 illustrates further aspects of the example system environment for event-driven scheduling using directed acyclic graphs, including event-driven analysis of a directed acyclic graph to remove nodes due to cancellation or failure, according to one embodiment. As shown in the example of FIG. 6, a cancellation or failure indication with respect to job 112P may be submitted to the job scheduler 100 after evaluation of the job submission event 196 discussed above. The cancellation or failure indication may represent a job cancellation event 197. The cancellation or failure indication may be generated based on user input (e.g., requesting cancellation of job 112P) or generated automatically based on a failed execution of the job 112P. The node corresponding to job 112P may be removed from the graph 130 in response to the event 197. Automatic and programmatic evaluation and analysis of the event 197 may also determine that the canceled job 112P has a DependedOn relationship with job 112Q. In one embodiment, the node corresponding to job 112Q may also be removed from the graph 130 since its DependsOn relationship can never be satisfied in light of the cancellation or failure of job 112P. Similarly, the automatic and programmatic evaluation and analysis may remove any nodes dependent on the job 112Q, and so on. In this manner, the graph 130 may be updated efficiently to remove a chain of nodes dependent on a canceled or failed job. The remainder of the graph 130 may be untouched in this particular process. In one embodiment, cancellation of dependent jobs such as the job 112Q may be performed based (at least in part) on a policy. Alternatively, the policy may dictate that the job 112Q (and any other dependent jobs) should remain in the graph in a pending state (subject to evaluation) in light of the job cancellation event 197, e.g., by treating the event 197 as completion of the earlier-submitted job 112P. Such a policy may be globally applicable to many clients, specific to one client, or specific to particular jobs.

Figure 7:
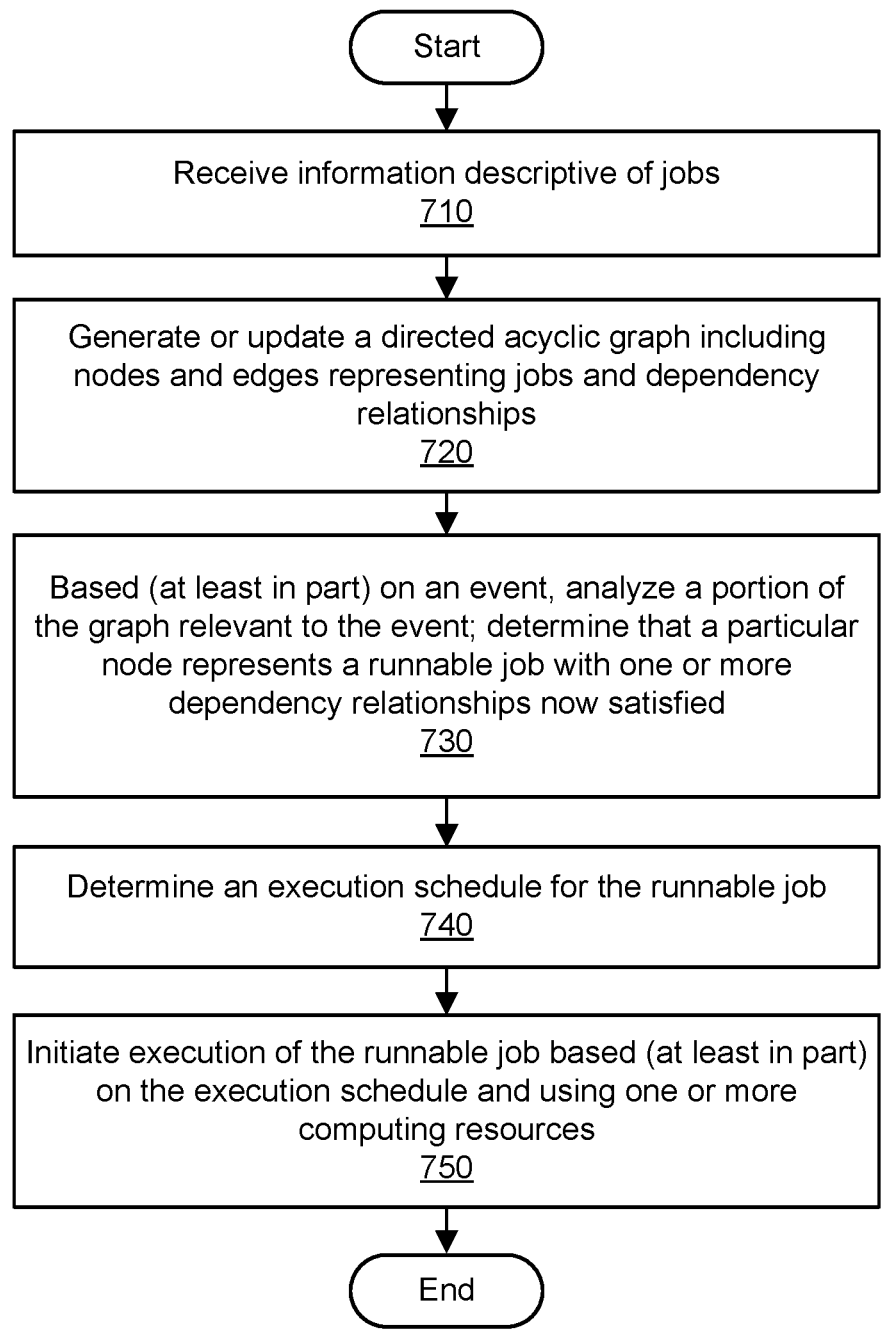
FIG. 7 is a flowchart illustrating a method for event-driven scheduling using directed acyclic graphs, according to one embodiment.

FIG. 7 is a flowchart illustrating a method for event-driven scheduling using directed acyclic graphs, according to one embodiment. As shown in 710, information descriptive of jobs (e.g., job definitions) may be received by a job scheduler from a client. In one embodiment, job definitions that do not specify job-level dependencies may be added to an execution schedule for execution without delay. In one embodiment, at least some of the job definitions may be backed up in a data store upon receipt by the job scheduler. For example, job definitions that do specify job-level dependencies may be stored in the data store as well as in memory at the job scheduler.

As shown in 720, a directed acyclic graph may be generated or updated based (at least in part) on the job information. The graph may include nodes that represent jobs and edges that represent dependency relationships between individual jobs. A dependency relationship may specify a condition to be met, such as successful execution of a job, failed execution of a job, completion of a job with either success or failure, successful execution of a threshold percentage of a job, initiation of execution of a job, and so on. In one embodiment, each dependency relationship may include at least one DependsOn element associated with one or more nodes and at least one DependedOn element associated with one or more other nodes.

In one embodiment, as long as the job scheduler remains operable, the directed acyclic graph may be updated efficiently in response to new events and not rebuilt entirely with every event. As shown in 730, a portion of the graph that is relevant to an event may be analyzed and evaluated in response to that event. In one embodiment, one or more nodes in the directed acyclic graph may be evaluated to determine whether the node(s) (and corresponding job(s)) are runnable. Runnable nodes and jobs may have no unmet "DependsOn" dependency relationships and may be executed without delay, e.g., without necessarily waiting for other jobs. Satisfaction of a dependency may be determined based (at least in part) on an event associated with a job that the dependency involves. For example, if a particular job was dependent on completion of an earlier-submitted job, and that earlier-submitted job has completed execution, then the particular job may be deemed runnable by evaluation of its corresponding node in the graph in response to an execution event associated with the earlier-submitted job. As shown in 720, automatic and programmatic evaluation of the graph may determine that a particular node now represents a runnable job.

As shown in 740, an execution schedule may be determined for the runnable job. The execution schedule may be implemented using an ordered data structure such as a queue or linked list. The order of jobs in the execution schedule may be based on time of submission to the job scheduler or any other suitable criteria. Determining the execution schedule for the runnable job may include adding the job to an existing execution schedule that includes one or more other runnable jobs, e.g., by inserting the runnable job at the end of the list, at the beginning of the list, or between other jobs in the list. As shown in 750, execution of the runnable job may be initiated based (at least in part) on the execution schedule. For example, execution of the runnable job may be initiated when no other jobs outrank the runnable job in a queue of runnable jobs. The execution may be performed using one or more computing resources (e.g., virtual compute instances) of a provider network.

Figure 8:
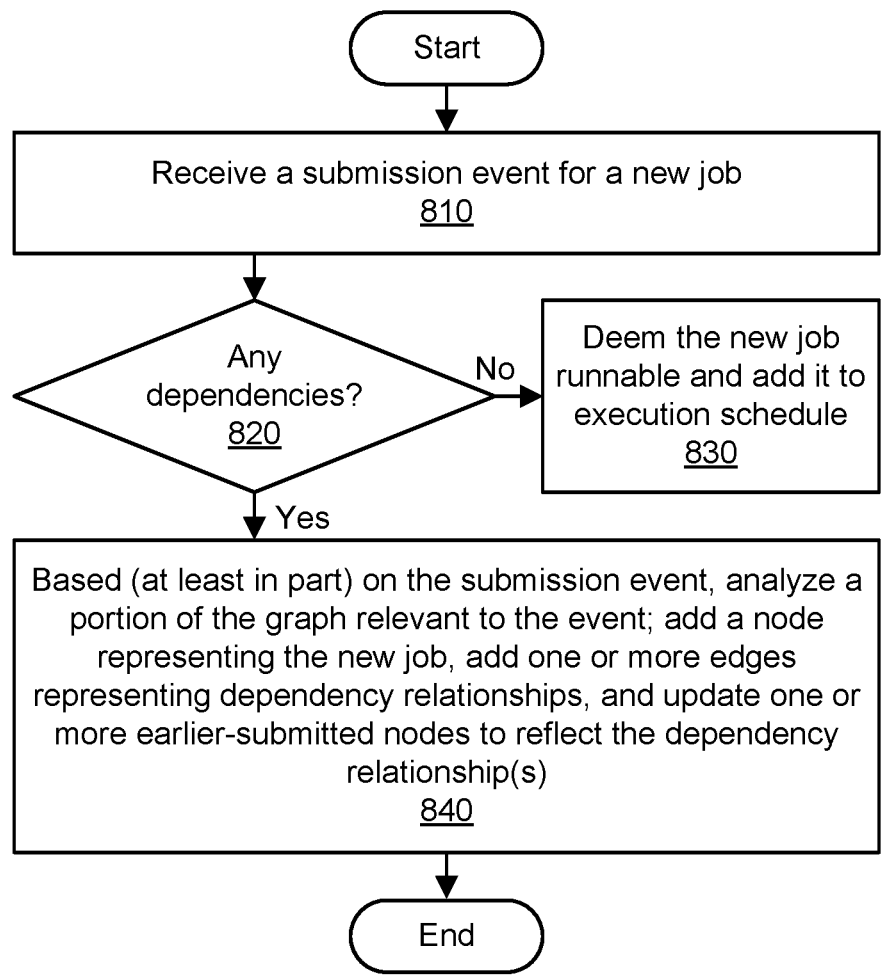
FIG. 8 is a flowchart illustrating a method for event-driven scheduling using directed acyclic graphs, including event-driven analysis of a directed acyclic graph to add a new node representing a newly submitted job and add one or more new dependency relationships, according to one embodiment.

FIG. 8 is a flowchart illustrating a method for event-driven scheduling using directed acyclic graphs, including event-driven analysis of a directed acyclic graph to add a new node representing a newly submitted job and add one or more new dependency relationships, according to one embodiment. As shown in 810, a job submission event associated with a new job may be received at a job scheduler. The new job may be provided by a client using a job definition. As shown in 820, an automatic and programmatic evaluation process may determine whether the new job has any dependencies on other jobs, as specified in the job definition. If not, then as shown in 830, the new job may be deemed runnable and may be added to an execution schedule. The order of jobs in the execution schedule may be based on time of submission to the job scheduler or any other suitable criteria. If the new job does have one or more dependencies, then as shown in 840, a relevant portion of the directed acyclic graph may be analyzed automatically and programmatically. The analysis may be performed based (at least in part) on the job submission event. As a result of the analysis, a new node that represents the new job may be added to the graph. One or more edges representing the dependency relationships may also be added to the graph, e.g., by adding DependsOn element to the new node. One or more earlier-submitted nodes may also be updated to reflect the dependency relationship(s), e.g., by adding or updating a DependedOn element to those nodes.

Figure 9:
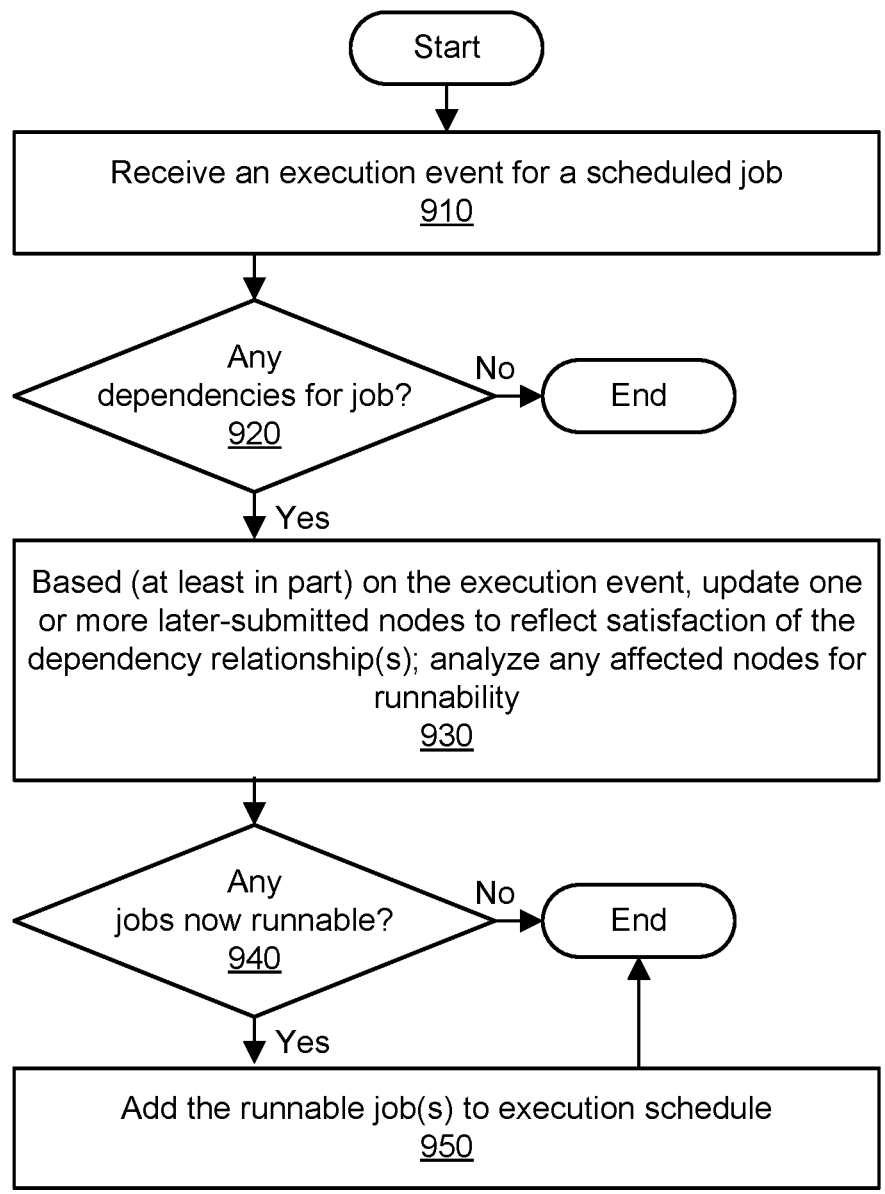
FIG. 9 is a flowchart illustrating a method for event-driven scheduling using directed acyclic graphs, including event-driven analysis of dependency relationships in a directed acyclic graph to determine that one or more jobs are runnable, according to one embodiment.

FIG. 9 is a flowchart illustrating a method for event-driven scheduling using directed acyclic graphs, including event-driven analysis of dependency relationships in a directed acyclic graph to determine that one or more jobs are runnable, according to one embodiment. As shown in 910, an execution event may be received by a job scheduler. The execution event may be associated with a job whose execution has been initiated. The execution event may specify that an execution condition has been met, such as successful execution of a job, failed execution of a job, completion of a job with either success or failure, successful execution of a threshold percentage of a job, initiation of execution of a job, and so on. As shown in 920, an automatic and programmatic evaluation process may determine whether the job associated with the execution event has any dependency relationships with other jobs, e.g., whether any other jobs are dependent on the executed job. If not, then the process may end without evaluation or modification of the directed acyclic graph. If so, then as shown in 930, a relevant portion of the directed acyclic graph may be analyzed automatically and programmatically. The analysis may be performed based (at least in part) on the execution event. In the operation shown in 930, one or more later-submitted nodes that are dependent on the executed job may be updated to reflect that the dependency has been satisfied. These affected nodes may also be analyzed to determine their runnability, e.g., whether the affected nodes have any unmet DependsOn relationships. As shown in 940, the automatic and programmatic evaluation process may determine whether any jobs are now runnable after being updated in response to the execution event. If so, then as shown in 950, the runnable job(s) may be added to the execution schedule in an appropriate order.

Illustrative Computer System

In at least some embodiments, a computer system that implements a portion or all of one or more of the technologies described herein may include a computer system that includes or is configured to access one or more computer-readable media. FIG. 10 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a plurality of computing resources of a provider network;
   a data store; and
   one or more computing devices configured to implement a job scheduler, wherein the job scheduler is configured to:
   receive information descriptive of a plurality of jobs;
   generate a directed acyclic graph comprising a plurality of nodes and a plurality of edges, wherein the nodes represent at least a portion of the plurality of jobs, wherein the edges represent dependency relationships between individual ones of the jobs, and wherein information descriptive of jobs having unsatisfied dependency relationships is stored in a queue of pending jobs in the data store, wherein the queue of pending jobs is separate from the directed acyclic graph;
   based at least in part on one or more events generated external to the directed acyclic graph regarding one or more of the plurality of jobs, and on analysis of the directed acyclic graph, determine that one of the nodes represents a runnable job, wherein one or more of the dependency relationships for the runnable job, represented by one or more edges of the plurality of edges associated with the one of the nodes, have been satisfied by the one or more events generated external to the directed acyclic graph; and
   place the runnable job in a queue of runnable jobs separate from the directed acyclic graph; and
   wherein at least a subset of the computing resources are configured to:
   initiate execution of the runnable job from the queue of runnable jobs.

2. The system as recited in claim 1, wherein, based at least in part on an event associated with submission of a new job having one or more new dependency relationships with one or more earlier-submitted jobs, the job scheduler is further configured to:
   add, to the directed acyclic graph, a new node representing the new job;
   add, to the directed acyclic graph, one or more new edges representing the one or more new dependency relationships between the new job and the one or more earlier-submitted jobs; and
   update, in the directed acyclic graph, one or more nodes representing the one or more earlier-submitted jobs without evaluating other nodes not associated with the one or more new dependency relationships.

3. The system as recited in claim 1, wherein the one or more events comprise an event associated with execution of a scheduled job having one or more dependency relationships with one or more later-submitted jobs, and wherein, based at least in part on the event associated with the execution of the scheduled job, the job scheduler is further configured to:
   remove, from the directed acyclic graph, one or more edges representing at least one of the dependency relationships with the one or more later-submitted jobs; and
   update, in the directed acyclic graph, one or more nodes representing the one or more later-submitted jobs without evaluating other nodes not having dependency relationships with the scheduled job.

4. A computer-implemented method, comprising:
   generating a directed acyclic graph comprising a plurality of nodes and a plurality of edges, wherein the nodes represent a plurality of jobs, and wherein the edges represent dependency relationships between individual ones of the jobs;
   based at least in part on one or more events generated external to the directed acyclic graph regarding one or more of the plurality of jobs, and on analysis of the directed acyclic graph, determining that one of the nodes represents a runnable job, wherein one or more of the dependency relationships for the runnable job, represented by one or more edges of the plurality of edges associated with the one of the nodes, are satisfied by the one or more events generated external to the directed acyclic graph;
   determining an execution schedule for the runnable job, wherein the execution schedule is separate from the directed acyclic graph; and
   based at least in part on the execution schedule, initiating execution of the runnable job using one or more computing resources.

5. The method as recited in claim 4, wherein the method further comprises, based at least in part on an event associated with submission of a new job having one or more new dependency relationships with one or more earlier-submitted jobs:
   adding, to the directed acyclic graph, a new node representing the new job;

adding, to the directed acyclic graph, one or more new edges representing the one or more new dependency relationships between the new job and the one or more earlier-submitted jobs; and updating, in the directed acyclic graph, one or more nodes representing the one or more earlier-submitted jobs without evaluating other nodes not associated with the one or more new dependency relationships.

6. The method as recited in claim 4, wherein the one or more events comprise an event associated with execution of a scheduled job having one or more dependency relationships with one or more later-submitted jobs, and wherein the method further comprises, based at least in part on the event associated with the execution of the scheduled job:

removing, from the directed acyclic graph, one or more edges representing at least one of the dependency relationships with the one or more later-submitted jobs; and updating, in the directed acyclic graph, one or more nodes representing the one or more later-submitted jobs without evaluating other nodes not having dependency relationships with the scheduled job.

7. The method as recited in claim 4, further comprising:
determining that no nodes are dependent on the runnable job; and
based at least in part on determining that no nodes are dependent on the runnable job, removing the node representing the runnable job from the directed acyclic graph.

8. The method as recited in claim 4, further comprising:
determining that a newly submitted job has no dependency relationships with other jobs; and
based at least in part on determining that the newly submitted job has no dependency relationships with other jobs, placing the newly submitted job in a queue of runnable jobs without adding a node representing the newly submitted job to the directed acyclic graph.

9. The method as recited in claim 4, further comprising:
based at least in part on an event associated with failure or cancellation of a job and on a policy, removing, from the directed acyclic graph, one or more nodes representing one or more jobs having dependency relationships with the job or having dependency relationships with one or more removed nodes.

10. The method as recited in claim 4, further comprising:
loading, from a data store, information descriptive of a plurality of jobs having unsatisfied dependency relationships; and
rebuilding the directed acyclic graph after a scheduler failure based at least in part on the information descriptive of the plurality of jobs having unsatisfied dependency relationships.

11. The method as recited in claim 4, wherein the one or more events comprise an event associated with completion of a threshold percentage of a job.

12. The method as recited in claim 4, further comprising:
determining that a newly submitted job has a dependency relationship on an earlier-submitted job; and
based at least in part on determining that the newly submitted job has the dependency relationship on the earlier-submitted job, adding to the directed acyclic graph a node corresponding to the newly submitted job and a node corresponding to the earlier-submitted job.

13. The method as recited in claim 4, wherein determining the execution schedule for the runnable job comprises:
inserting the runnable job in an ordered list of runnable jobs based at least in part on one or more timestamps of job submission, wherein the list of runnable jobs is not resorted in the inserting the runnable job.

14. A computer-readable storage medium storing program instructions that, if executed, perform:

generating a directed acyclic graph comprising a plurality of nodes and a plurality of edges, wherein the nodes represent a plurality of jobs, and wherein the edges represent dependency relationships between individual ones of the jobs;

based at least in part on one or more events generated external to the directed acyclic graph regarding one or more of the plurality of jobs, and on analysis of the directed acyclic graph, determining that one of the nodes represents a runnable job, wherein one or more of the dependency relationships for the runnable job, represented by one or more edges of the plurality of edges associated with the one of the nodes, are satisfied by the one or more events generated external to the directed acyclic graph;

determining an execution schedule for the runnable job, wherein the execution schedule is separate from the directed acyclic graph, and comprises an execution order of the runnable job and one or more additional runnable jobs; and based at least in part on the execution schedule, initiating execution of the runnable job using one or more computing resources of a provider network.

15. The computer-readable storage medium as recited in claim 14, wherein, based at least in part on an event associated with submission of a new job having one or more new dependency relationships with one or more earlier-submitted jobs, the program instructions are further computer-executable to perform:

adding, to the directed acyclic graph, a new node representing the new job;

adding, to the directed acyclic graph, one or more new edges representing the one or more new dependency relationships between the new job and the one or more earlier-submitted jobs; and updating, in the directed acyclic graph, one or more nodes representing the one or more earlier-submitted jobs without evaluating other nodes not associated with the one or more new dependency relationships.

16. The computer-readable storage medium as recited in claim 14, wherein the one or more events comprise an event associated with execution of a scheduled job having one or more dependency relationships with one or more later-submitted jobs, and wherein, based at least in part on the event associated with the execution of the scheduled job, the program instructions are further computer-executable to perform:

removing, from the directed acyclic graph, one or more edges representing at least one of the dependency relationships with the one or more later-submitted jobs; and updating, in the directed acyclic graph, one or more nodes representing the one or more later-submitted jobs without evaluating other nodes not having dependency relationships with the scheduled job.

17. The computer-readable storage medium as recited in claim 14, wherein the program instructions are further computer-executable to perform:

determining that no nodes are dependent on the runnable job; and based at least in part on determining that no nodes are dependent on the runnable job, removing the node representing the runnable job from the directed acyclic graph.

18. The computer-readable storage medium as recited in claim 14, wherein the program instructions are further computer-executable to perform:
   determining that a newly submitted job has no dependency relationships with other jobs; and
   based at least in part on determining that the newly submitted job has no dependency relationships with other jobs, placing the newly submitted job in a queue of runnable jobs without adding a node representing the newly submitted job to the directed acyclic graph.

19. The computer-readable storage medium as recited in claim 14, wherein the program instructions are further computer-executable to perform:
   based at least in part on an event associated with failure or cancellation of a job and on a policy, removing, from the directed acyclic graph, one or more nodes representing one or more jobs having dependency relationships with the job or having dependency relationships with one or more removed nodes.

20. The computer-readable storage medium as recited in claim 14, wherein the program instructions are further computer-executable to perform:
   loading, from a data store, information descriptive of a plurality of jobs having unsatisfied dependency relationships; and
   rebuilding the directed acyclic graph after a scheduler failure based at least in part on the information descriptive of the plurality of jobs having unsatisfied dependency relationships.

* * * * *